US005174802A

United States Patent [19]

Hsu

[11] Patent Number: 5,174,802

[45] Date of Patent: Dec. 29, 1992

[54] PROCESS FOR MANUFACTURING VARIOUS SERIES OF PLUG-IN LIGHT BULBS

[76] Inventor: Ming-hsun Hsu, P. O. Box 372, Hsinchu, Taiwan

[21] Appl. No.: 760,878

[22] Filed: Sep. 16, 1991

[51] Int. Cl.[5] .............................................. C03B 29/04

[52] U.S. Cl. .......................................... 65/34; 65/42; 65/59.26

[58] Field of Search ............... 65/34, 42, 59.26, 59.32, 65/59.7

[56] References Cited

U.S. PATENT DOCUMENTS 1,647,999 11/1927 Laskey .......................... 65/59.26 X
1,945,769 2/1934 Brumley ................................ 65/34
2,945,327 7/1960 Malm et al. ............................ 65/42
2,946,641 7/1960 Wisner .............................. 65/34 X
3,270,237 8/1966 Danko ............................... 65/34 X
4,749,901 6/1988 Demas .......................... 65/59.26 X

*Primary Examiner*—Robert L. Lindsay

[57] ABSTRACT

A process for manufacturing various series of plug-in light bulbs wherein a glass tube used in making a Wedge lamp having an increasing diameter toward one end, inserting two conductive wires and a button rod within this tube integrated with its bottom end by heating, pinching and attaching three filaments to the top portion of the button rod by heating and connecting to the conductive wires with a plurality of tungsten filaments to form a glow portion, inserting a bulb portion over the top end of the tube, then shaping a integral body by heating a lower portion of the tube rod slightly below the bottom end of the button rod, which is fused off by heating, the lower portion of the conductive wires being folded and stuck to the respective outside walls of the bottom end of the tube.

1 Claim, 3 Drawing Sheets

PROCESS FOR MANUFACTURING VARIOUS SERIES OF PLUG-IN LIGHT BULBS

BACKGROUND OF THE PRESENT INVENTION

The conventional manner for manufacturing various series of plug-in bulbs is that a bulb must be mounted on and soldered to a screwed brass head after the bulb has been shaped. This process is very complicated such that a defect in contact due to the poor treatment applied to the lead-in-wires will easily be induced when the bulb is being mounted and soldered to the brass head and thereby shorten the life of the light bulb. Furthermore, when the brass head is inserted onto the bulb base, the brass head more or less exposes to the bulb base. This may easily cause a dangerous accident. However, the brass head has been widely used in practice even though it is very uneconomical. On the other hand, the various conventional series of plug-in light bulbs are unable to be manufactured by means of a continuous process, leading to the waste both in labor and materials. This fact has been recognized as non-progressive in the environment of today's efficiency-oriented era. Moreover, as various conventional series of screwed light bulbs must be mounted and dismounted by means of the screw driving method, they are not convenient to be handled. Furthermore, when the screw pitch between the brass head and the bulb base is large, the light bulb will tilt if it is not positioned properly. This will be the cause of incomplete contact and certainly is not user-friendly.

A wedge type light bulb is manufactured by an integrated shaping process, and employed for electrical appliances draining a small electrical current. It not only demands high cost but also restricts itself from being widely adopted for various kinds of electrical appliances. Therefore, it can not be utilized economically and practically.

It is well known that the Wedge light bulbs are used with electrical appliances which drain a small current. Thereby the tungsten filament used by the Wedge light bulb should not be very long, such that its external shape appears as a peanut. However, if the aforesaid light bulb is used for large current electrical appliances, its tungsten filament must be lengthened to allow a large current to flow through it. Because the opening of the neck of the Wedge light bulb is so narrow that, the tungsten filament will not be easily inserted into the bulb through the opening.

SUMMARY OF THE PRESENT INVENTION

The present application relates to a process for manufacturing various series of plug-in light bulbs, from integrating the glass of general material sodium glass and of special material lead glass used by Wedge by means of sealing machine. An automatic filament sticking machine and air exhaust machine in association with baking process are applied with different temperatures during the different steps. This process will reduce the manufacturing cost, save time and stabilize the quality of the bulbs. Light bulbs manufactured by means of the aforesaid process are suitable for use in various kinds of electrical appliances in compliance with the international standards.

The following conditions are indispensable for producing light bulbs through the continuous process and are cost efficient.

1. Two different materials of glass are soldered and shaped into an integral body without any defects under a controlled temperature in the baking process to reduce the manufacturing costs.

2. The integrated portion of the bulb and button rod should be kept in upright position so as to unify the shape of products without any defect such as tilted light bulbs.

3. The disposing position of the filaments should correspond to the length of the filaments so as to maintain the quality.

4. The timing of the heating and the forming of the bulb shape must be precise so as to maintain its integrity and reduce the cost caused by defective products.

5. The coiling manner of tungsten filaments has to match with its specification. The size thereof must be smaller than the opening of the bulb neck so as to facilitate the treatment of bulb and button rod.

6. The length of tungsten filament has to be made to certain standard to withstand electric current flowing thereinto and prolong its life.

7. An air exhaust hole has to be formed on the button rod for exhausting.

The main object of the present invention is to provide a process of manufacturing various series of plug-in light bulbs. It is a feature of the present invention that the light bulb enables its assembly by means of insertion without screwing a brass head and getting rid of the defects mentioned above.

Another object of the present invention is to provide a process for manufacturing various series of plug-in light bulbs which is free of manual operation, consistency in quality, standardization in specification, economy in cost and suitability for mass production.

The third object of the present invention is to provide a process for manufacturing various series of plug-in light bulbs which employs simple equipment instead of high-tech and expensive equipment.

A detailed description of the process for manufacturing various series of plug-in light bulbs of the present invention is provided below along with accompanying drawings.

DETAILED DESCRIPTION OF THE PREFERRED EMBODIMENT

Figure 1:
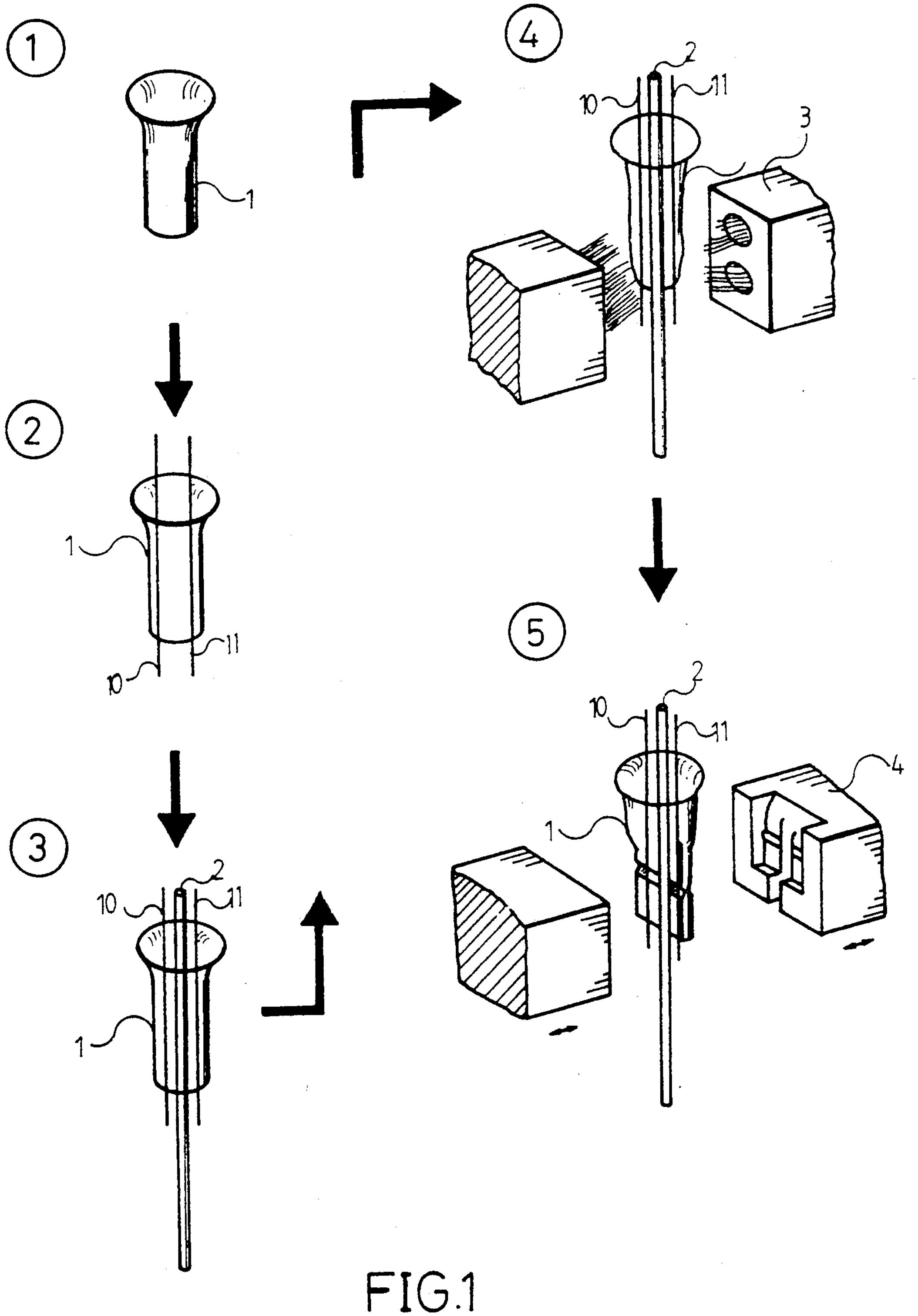
FIG. 1 is a flow chart illustrating the first sequence of steps in the manufacturing process.
Figure 2:
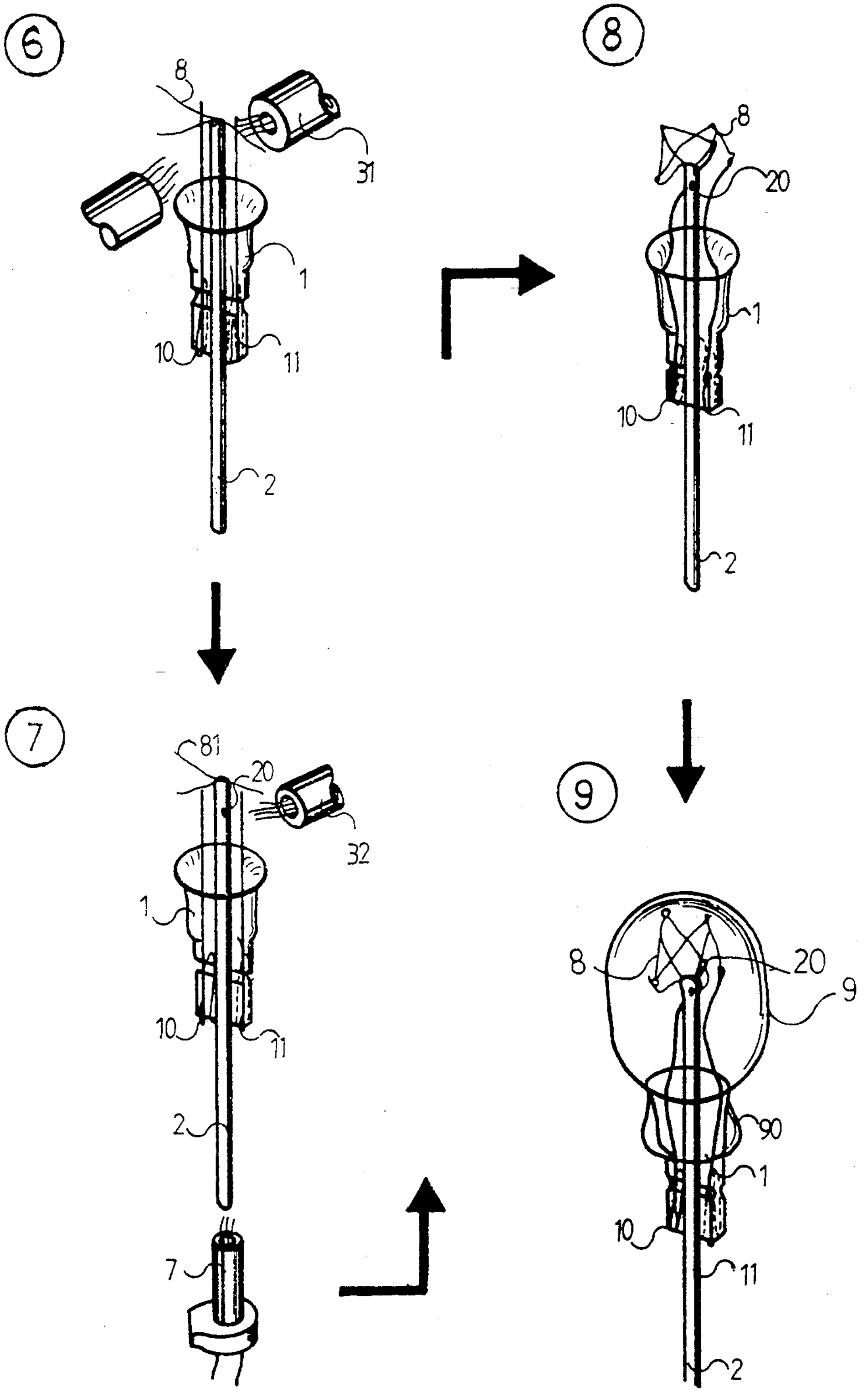
FIG. 2 is a flow chart illustrating the second sequence of steps in the manufacturing process.
Figure 3:
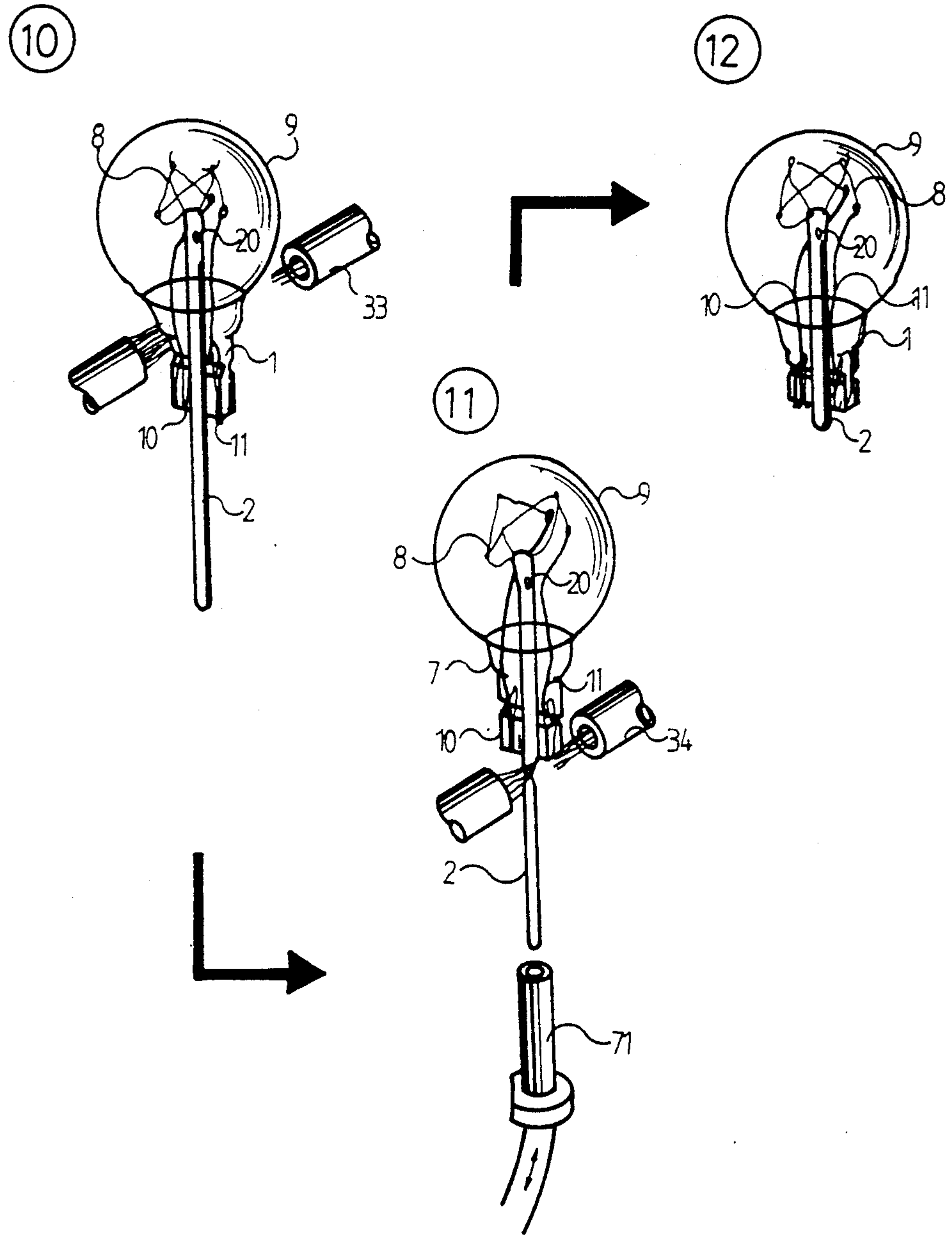
FIG. 3 is a flow chart illustrating the third sequence of steps in the manufacturing process.

Referring to FIGS. 1 to 3, a glass tube 1, has a increasing diameter toward one end extending upwards and outwards forms a top end, and the other end forms a bottom end. The diameter of the top end is bigger in size than that of the bottom end. First, the glass tube 1 is positioned by a clamp of a sealing machine with its top end upright.

Second, two conductive wires 10, 11 are oppositely disposed inside the tube 1 adjacent to its inner wall. A button rod 2 is disposed between the conductive wires 10, 11. The bottom end of the tube 1 is then baked approximately at 1200 degrees Centigrade by a heating device 3. When the bottom end of the tube 1 has been softened, it is compressed in the direction perpendicular to the wires 10, 11 by a shaping model 4. When the bottom end of the tube 1 is shaped, the portions of the conductive wires 10, 11 and of the button rod 2 originally positioned inside the tube 1 are also compressed to fixedly adhere to the inner wall of the bottom end.

Next, the top portion of the button rod 2 is baked approximately at 1000 degrees Centigrade by a heating device 31. When the top portion is softened, three filaments 81 are then attached thereto. After the three filaments 81 are fixedly attached to the top portion of the button rod 2, an air exhaust hole 20 is formed on a place slightly below the top portion of the button rod 2 by a heating device 32 and an air influx device 7 which blows air into the button rod 2 from its bottom portion. Then, a glowing portion 8 is formed by respectively connecting the three filaments 81, the button rod 2 and the conductive wires 10, 11 together with a plurality of tungsten filaments.

A glass bulb 9 is inserted over the top end of the tube 1 and adhered thereto. The junction portion of the tube 1 and the bulb 9 is integrated by baking and moving a residual portion 90 formed by means of the insertion approximately at 1000 degrees Centigrade with a heating device 33. A vacuum is created in the bulb 9 by a vacuum pump 71 and a lower portion of the button rod 2 is heated rod is slightly below the bottom end of the tube 1 by a heating device 34 to fuse off the button rod 2 and to fold and stick the lower portion of the conductive wires 10, 11 to the respective outside walls of the bottom end of the tube 1. A various series of plug-in light bulb is therefore completed.

Many modifications and variations of the process for manufacturing various series of plug-in light bulbs of the present invention would occur to one skilled in the art and all such modifications and variations are deemed to be within the spirit and scope of the present invention as defined by the appended claims and legal equivalents.

I claim:

1. A process for manufacturing various series of plug-in light bulbs comprising a plurality steps thereof, a) disposing two conductive wires oppositely inside a glass tube, which has an increasing diameter toward top end;

b) installing a button rod in the center of said tube, said button rod being placed between said conductive wires;

c) baking the other end of said tube to the condition of being softened and compressing this end in a direction perpendicular to the wires and said button rod to the same diameter as said button rod;

d) baking said top portion of said button rod and attaching three filaments thereto;

e) forming an air exhaust hole at a place slightly lower than said top portion of said button rod by heating said portion and blowing air thereinto from said bottom portion of said button rod;

f) forming a glowing portion by respectively connecting said three filaments, button rod and conductive wires altogether with a plurality of tungsten filaments;

g) adhering a glass bulb on said end of larger diameter of said tube and removing the residual portion caused by the adhesion with heating;

h) creating a vacuum in said bulb and heating the lower portion of said button rod which is slightly below said end of said tube as to fuse off said button rod.

* * * * *